June 8, 1954  A. E. SAUNDERS-SINGER  2,680,397
MICROSCOPE MANIPULATOR
Filed April 19, 1949  4 Sheets-Sheet 1
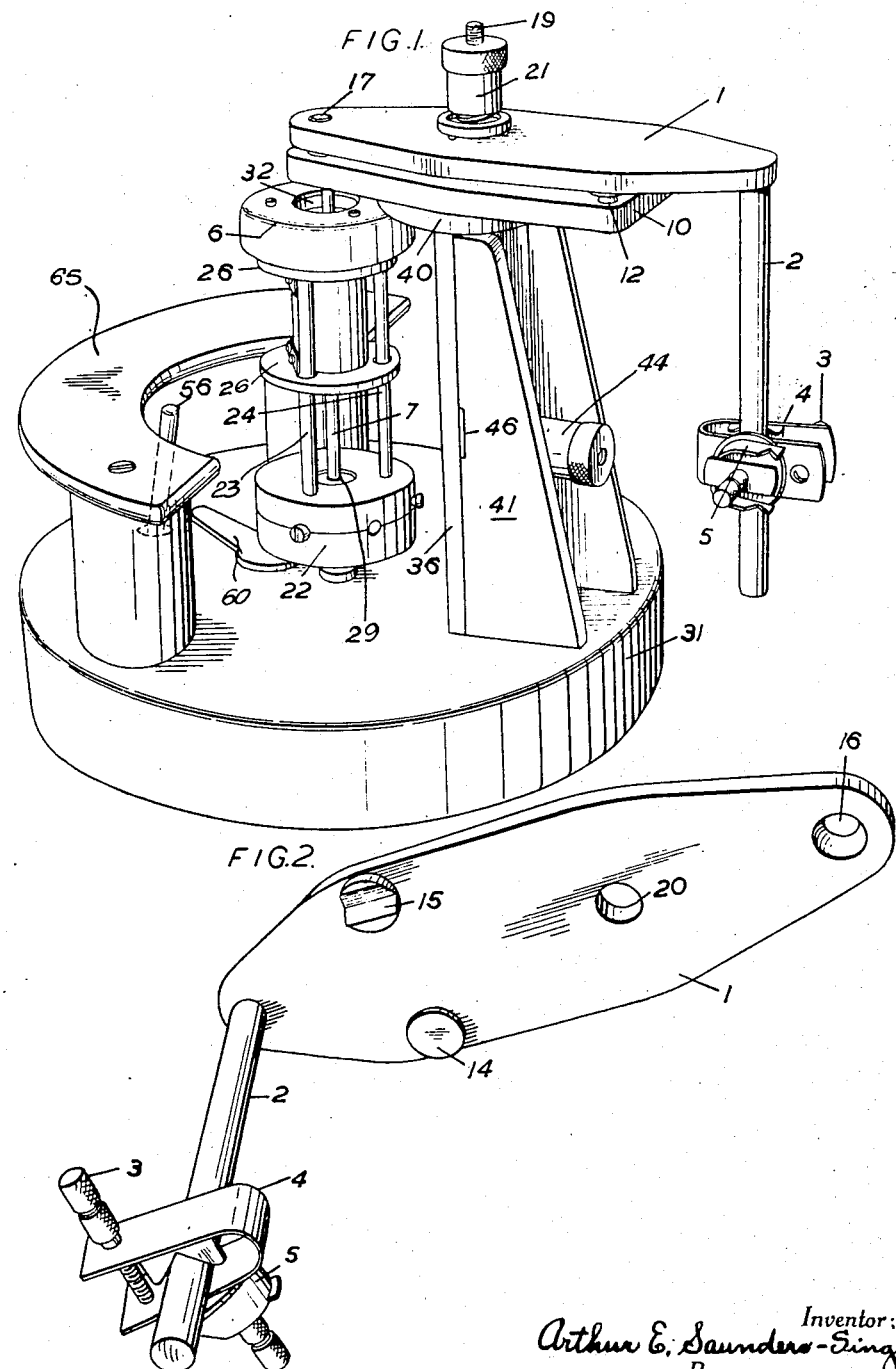
Inventor:—
Arthur E. Saunders-Singer,
By
Smith, Michael & Gardiner,
Attorneys.

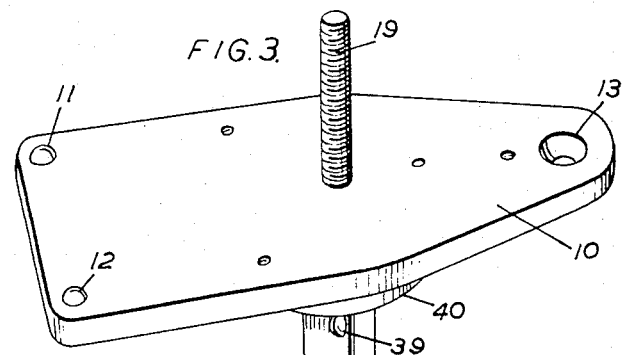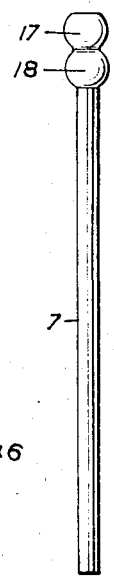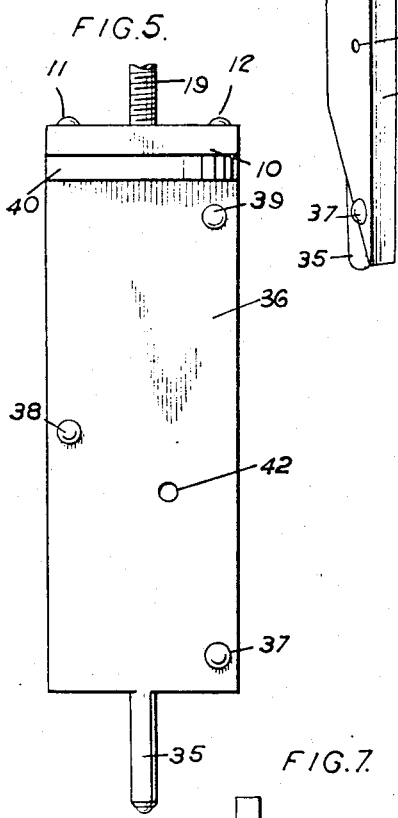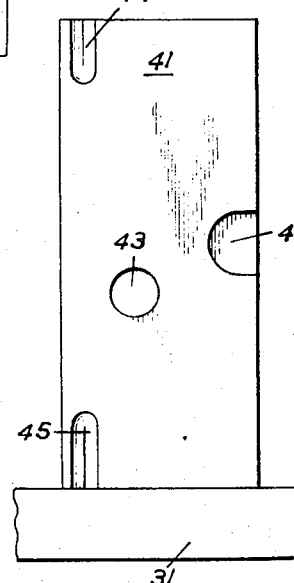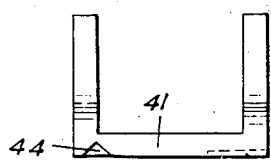

June 8, 1954     A. E. SAUNDERS-SINGER     2,680,397
MICROSCOPE MANIPULATOR
Filed April 19, 1949     4 Sheets-Sheet 3
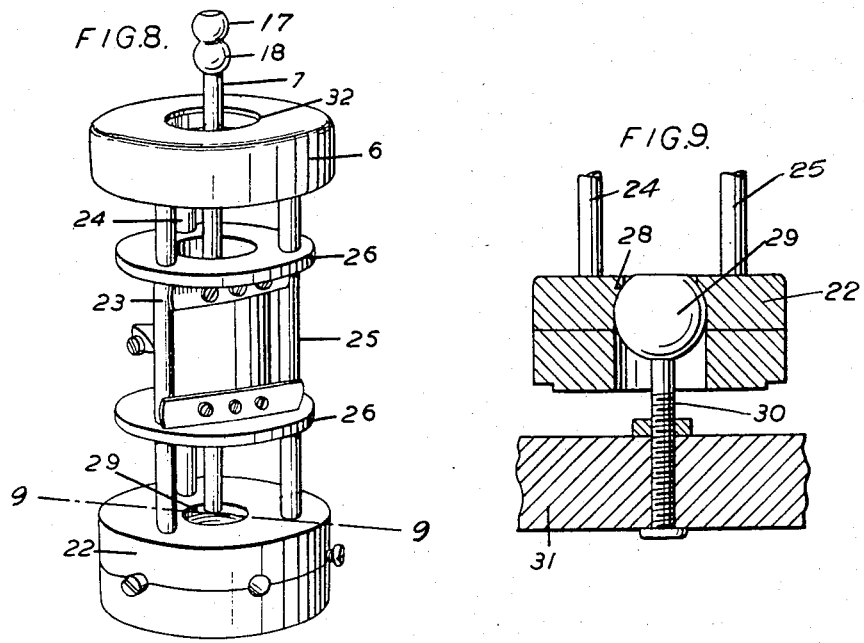
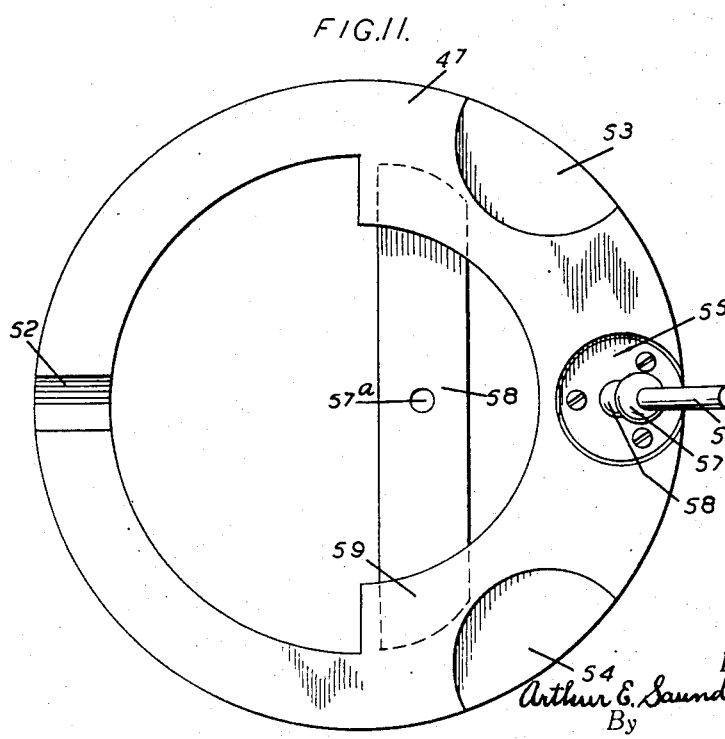
Inventor
Arthur E. Saunders-Singer,
By
Smith, Michael & Gardiner.
Attorneys.

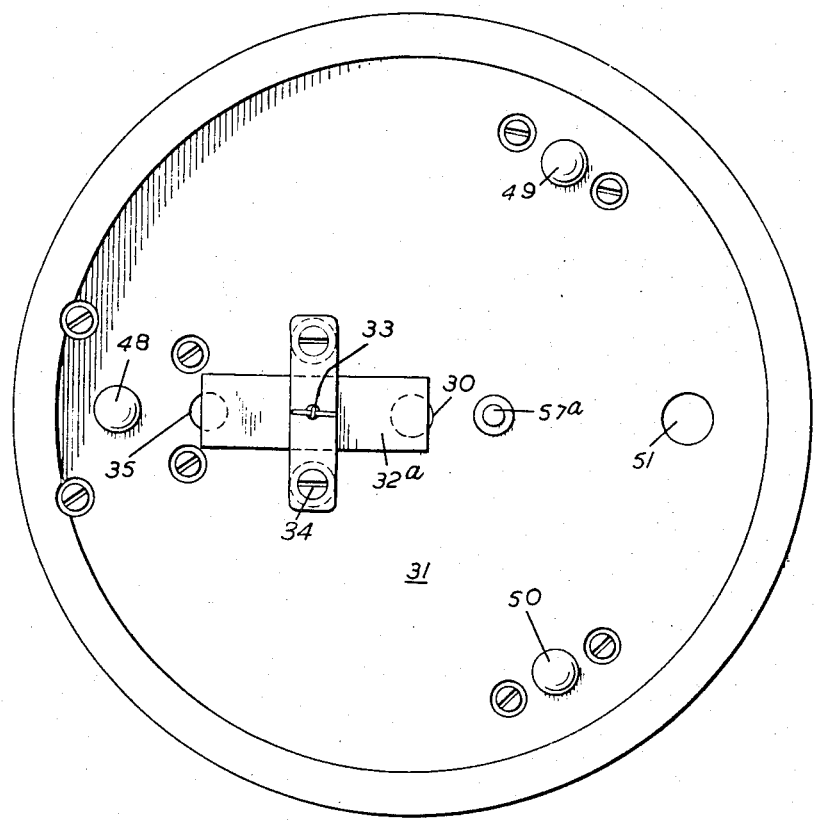

Patented June 8, 1954

2,680,397

UNITED STATES PATENT OFFICE 2,680,397

MICROSCOPE MANIPULATOR

Arthur E. Saunders-Singer, Reading, England

Application April 19, 1949, Serial No. 88,314

Claims priority, application Great Britain
April 27, 1948

16 Claims. (Cl. 88—40)

This invention relates to microscope manipulators. The purpose of such devices is to impart motion to a microscope dissecting needle, stylus or pipette by hand and through reduction mechanism, so that the large operating movements of the operator's hand may be reduced and may be readily observable under the microscope.

Since the subject of the invention is thus a form of movement reduction apparatus, it is equally applicable to a mechanical stage or any other mechanism the operation of which requires very small and accurately controlled movements. The member to be moved will be referred to throughout this specification as the "stylus."

Various types of microscope manipulators have already been produced. Some are comparatively complicated, involving the use of pneumatic pumps and the like. Others are more simple. Generally speaking, known types of microscope manipulators are complicated and expensive to manufacture and not entirely satisfactory in use.

In the known type of microscope manipulator to which this invention relates, there are fixed and movable members, conveniently in the form of plates, one moving over the surface of the other. The movement of one plate in relation to the other is caused by hand movement of a comparatively long operating lever fulcrumed on a ball joint resting in a cone in the base plate, and terminating in a driving point, which is a ball joint, in a plain hole in the movable plate. Thus, each movement imparted by hand to the remote end of the operating lever transmits small movements to the movable plate in its own plane, which movement is transmitted through fixed but adjustable linkages to the stylus. Movement in a plane at right angles to the plane of the plates is obtained by a screw mechanism housed within the operating lever. Such apparatus suffers from some or all of the disadvantages hereinbefore outlined, and it is the object of this invention to provide an improved apparatus of this type having advantages not hitherto known.

A microscope manipulator made in accordance with this invention is of the type described and is characterised in that one member is held out of surface contact with the other by bearing points comprising spherical surfaces on one member working against a conical bearing or its equivalent, a groove and a plane surface, respectively, on the other member, so that wear is automatically taken up and lost motion and backlash thus obviated.

An equivalent of a conical bearing would be a three-point bearing.

The invention will be better understood by reference to the accompanying drawings which shows one particular example of apparatus made in accordance therewith, it being understood that modifications of the detailed construction are possible without departing from the scope of the invention.

Fig. 1 is a perspective of the apparatus.

Fig. 2 is a perspective of the underside of the top horizontal movable plate.

Fig. 3 is a perspective of the lower, fixed horizontal plate.

Fig. 4 is a side elevation of the operating lever.

Fig. 5 is a side view of the vertically movable plate.

Fig. 6 is a side view of the fixed vertical plate.

Fig. 7 is a plan of the part shown in Fig. 6.

Fig. 8 is a perspective, on an enlarged scale, of the hand grip and the second reduction mechanism.

Fig. 9 is a cross-section on line 9—9 of Fig. 8.

Fig. 10 is a plan of the underside of the base.

Fig. 11 is a plan of the under base.

Referring to the drawings—

The movable plate 1 carries a dependent arm link 2 to which is clamped, by normal clamping mechanism 3, a slidable carrier 4 which carries gripping jaws 5. To the gripping jaws 5 may be attached any extension desired leading to the stylus.

This mechanism just described is therefore the terminal point of the apparatus to which movement is imparted.

The other terminal point which receives manual movement from the hand of the operator is the hand grip 6, which operates as hereinafter described, to move the operating lever 7 about its pivot 18.

The horizontal movable plate 1, when assembled with the other parts of the mechanism, is disposed above the horizontal fixed plate 10 and rests on the bearing points now to be described. These bearing points on the fixed plate 10 comprise fixed spherical surfaces 11 and 12 and the conical bearing 13. This conical bearing 13 is, in theory, a trihedral bearing which would give three bearing points extended to infinity so that a line contact is obtained.

The bearing points on the horizontal movable plate 1 are the plane surface 14 which contacts spherical surface 11, V-groove 15 which contacts spherical surface 12, and conical bearing 16 which lies immediately above conical bearing 13.

When the movable plate 1 is assembled on fixed plate 10, conical bearing 16 rests on ball joint 17 of the operating lever 7. Similarly, the associated fixed ball joint 18 on the operating lever 7 rests on conical bearing 13.

The two horizontal plates 1 and 10 are therefore separated by these bearing points 11, 12, 13, 14, 15 and 16 working in conjunction with the operating lever at the ball joints 17 and 18. A threaded bolt 19 is provided on fixed plate 10 and passes through aperture 20 in movable plate 1 when the plates are assembled. The plate 1 is pressed down on to the bearings of plate 10 by a spring pressure device shown generally at 21 in Fig. 1.

It will be seen that movement of operating lever 7 about its pivot which is ball 18 working in conical bearing 13, will impart a very much reduced movement to ball 17, which movement is transmitted without backlash to movable plate 1 and, without alteration except by normal leverage, to the arm 2 and its associated parts. The length of the associated parts will of course increase or decrease by normal leverage the movement of the remote end of plate 1 associated with the stylus, but this can be readily adjusted by the user.

The second reduction mechanism (Fig. 8) comprises the rotatable hand grip 6 which is rigidly associated with a lower rotatable disc 22 by means of three rigid rods 23, 24 and 25. Sliding upon these rods 23, 24, 25 are vertically movable twin collars 26, between which are springs (not shown) for giving a slidable grip on operating lever 7. Thus collars 26 can be moved up and down on rods 23, 24, 25, and the point of contact between hand grip 6 and operating lever 7 can thus be moved towards or away from the fulcrum 18 to give increased or decreased leverage as required, all without preventing, or being affected by, the rotation of hand grip 6, or movement of hand grip 6 about pivot 29 as hereinafter described.

The hand grip 6 is pivoted for universal movement by means of a conical bearing 28 provided on lower rotatable disc 22 and resting on a ball 29 which is fixed to a threaded stud 30 threaded through the base 31. The hand grip 6 can thus be rocked universally by hand about the ball 29 within the limits imposed by the relative size of the hole 32 in the center of the hand grip 6 and the diameter of the operating lever 7. This rocking motion will thus move the arm 2 under extreme reduction, the degree of such reduction being controlled by the position of collars 26 up and down the slidable rods 23, 24, 25. Rotation of hand grip 6 will, however, rotate the ball 29 due to the tightness of the joint in conical bearing 28, and thus the stud 30 will be rotated and since this stud 30 is screwed through the base 31 and emerges at the underside thereof (see Fig. 10), vertical movement of said stud is effected.

This vertical movement of the stud 30 imparts motion through the rocking bridge 32ª (Fig. 10) pivoted at 33 to support 34, and equivalent motion in an opposite sense is thus imparted to the protruding extension 35 of the lower end of the vertically movable plate 36 (Fig. 5). Thus rotation of hand grip 6 in any position thereof raises and lowers the vertical movable plate 36 (Fig. 5).

The vertical movable plate 36 carries three ball joints fixed thereto 37, 38 and 39, and is integral with a platform 40 to which is secured the horizontal fixed plate 10 (Fig. 3). Thus rotation of hand grip 6 imparts vertical movement to both of the horizontal plates 1 and 10 and, consequently, to the stylus or mechanical stage. Rocking movement of hand grip 6 imparts horizontal movement in either direction to movable plate 1 and to the stylus or other mechanism connected to arm link 2.

The vertical movable plate 36 bears, through the bearing points 37, 38, and 39, on the fixed vertical bracket 41 which is rigidly supported on the base 31.

The vertical movable plate 36 is provided with an opening 42 through which a threaded bolt is passed and which bolt protrudes through aperture 43 in bracket 41, and this threaded bolt has attached thereto a spring pressure device shown generally at 44 in Fig. 1, which device functions to maintain plate 36 and bracket 41 in close relationship. The bearing points on the fixed bracket 41 are the two V-grooves 44, 45 and the smooth plane surface 46 working respectively, with ball joints 39, 37 and 38 on vertically movable plate 36, vertical movement being imparted to said plate 36 through the extension 35 which passes through the base 31.

A semi-circular hand rest 65 (Fig. 1) is provided for the apparatus upon which the hand or wrist of the operator can be rested while operating the hand grip 6.

A coarse adjustment is provided by the provision under the base 31 (Fig. 10) of an underbase 47 (Fig. 11), the two similarly sliding, one above the other, through suitable bearing points. The base 31 carries on its underside the three balls 48, 49, 50 and the conical bearing 51. The underbase 47 carries corresponding grooves 52 and plane surfaces 53, 54 and conical bearing 55. A coarse operating rod 56 has twin ball joint heads 57, 58 bearing, respectively, in conical bearings 51 and 55 so that movement of coarse operating rod 56 about its pivot 55 gives reduced movement to the base 31 together with all associated parts.

It will be seen, therefore, that the apparatus may be first placed in approximately correct position by manual placing. The coarse operating rod 56 may then be manipulated to bring the base 31 and all associated parts more nearly into position, and the final adjustment of the pipette or stylus can be made by rocking and rotation of hand grip 6.

It is desirable that a locking mechanism be provided for locking the base 31 to the under base 47 after adjustment, and this mechanism can conveniently take the form of a coarse threaded bolt 57ª which passes through base 31 and under base 47 and is screwed into a cross bar 58, ends of which cross bar 58 rest on a semi-annular flange 59 disposed within the outer framework of the under base 47. Such threaded bolt 57ª may be rotated by an operating lever 60 (Fig. 1) overlying the top surface of the base 31 and disposed immediately below the semi-circular hand rest 65 so that the rotation of said bolt 57ª tightens up the cross bar 58 and holds the base 31 rigid upon the underbase 47.

It will be seen that in this apparatus there is no lost motion even after wear, and that the apparatus made in accordance with this invention will call for no very fine limits of error in manufacture, and that this apparatus can be constructed far more cheaply than known types.

At the same time, very accurate controlled movement is obtainable, and the apparatus may be used comparatively roughly without irreparable harm.

What I claim is:

1. A microscope manipulator comprising a supporting member, a member mounted on said supporting member for sliding and limited swinging movements in a common plane, said members having opposed faces, spaced bearing elements disposed between the said opposed faces of said members to maintain said opposed faces spaced from each other and out of mutual surface contact except for contact at said spaced bearing elements, manually operable means linked to one point of said slidable and swingable member for transmitting movement thereto, and a linkage system connected between another point of said slidable and swingable member and the element being manipulated.

2. A microscope manipulator as defined in claim 1, wherein the manually operable means comprises a manually operable fulcrumed lever operably engaging said slidable and swingable member for imparting sliding and swinging movements thereto.

3. A microscope manipulator as defined in claim 2, wherein the manually operable lever is fulcrumed on the supporting member and has a free end thereof engaging said slidable and swingable member for imparting sliding and swinging movements thereto.

4. A microscope manipulator as defined in claim 3, wherein the manually operable lever is fulcrumed on the supporting member by a universal joint and has its free end connected to said slidable and swingable member by a universal joint.

5. A microscope manipulator as defined in claim 4, including a hand grip attached to said manually operable lever to facilitate manual movement of said lever about its fulcrum on said supporting member, wherein said hand grip is attached to said lever on the side thereof opposite the connection between the free end of said lever and said slidable and swingable member.

6. A microscope manipulator as defined in claim 5, wherein the hand grip is adjustable along the length of the manually operable lever to vary its effective leverage ratio.

7. A microscope manipulator comprising a supporting plate having a plane surface, a plate mounted on said supporting plate for sliding and limited swinging movements in a common plane and having a plane surface opposed to the plane surface of said supporting plate, spaced bearing elements on the plane surface of one of said plates, correspondingly spaced bearing surfaces on the opposed plane surface of the other of said plates for contact by the correspondingly spaced bearing elements on the opposed plane surface of the other of said plates, said spaced bearing elements and spaced bearing surfaces maintaining said opposed plane surfaces spaced apart and out of mutual surface contact except for contact between said bearing elements and bearing surfaces, manually operable means linked to one point of said slidable and swingable plate for transmitting movement thereto, and a linkage system connected between another point of said slidable and swingable plate and the element being manipulated.

8. A microscope manipulator comprising a substantially horizontal supporting plate having a plane surface, a plate mounted on and spaced above said supporting plate for sliding and limited swinging movements in a common plane and having a plane surface opposed to the plane surface of said supporting plate, spaced convex spherical surfaces on the plane surface of said supporting plate, a grooved projection and a relatively small plane surface located upon the opposed surface of said slidable and swingable plate in positions for engagement with said convex spherical surfaces on the plane surface of said supporting plate, engagement between said spaced convex spherical surfaces, grooved projection, and relatively small plane surface maintaining said opposed plane surfaces of said plates spaced apart and out of mutual surface contact except for contact between said spaced convex spherical surfaces, grooved projection, and relatively small plane surface, manually operable means for moving said slidable and swingable plate in relation to said supporting plate, and linkage means between said slidable and swingable plate and the element being manipulated.

9. A microscope manipulator comprising a supporting member, a member for sliding and limited swinging movements in a common plane, said members having opposed faces mounted on said supporting member, spaced bearing elements between said opposed faces of said members spacing apart said opposed faces and maintaining said opposed faces out of mutual surface contact except for contact at said spaced bearing elements and adapted to allow movement of said slidable and swingable member relative to said supporting member in a common plane, means for moving said supporting member in a direction perpendicular to said plane of movement of said slidable and swingable member, manually operable means for moving said slidable swingable member on said supporting member, and a linkage system connecting said slidable swingable member to the element being manipulated.

10. A microscope manipulator as defined in claim 9, wherein the means for moving said supporting member in a direction perpendicular to said plane of movement of said slidable and swingable member comprises a fixed vertical support, and a member attached to said supporting member and vertically slidable on said fixed support, and wherein the manually operable means for moving said slidable and swingable member on said supporting member is also operable to effect movement of said slidable member on said fixed support.

11. A microscope manipulator comprising a supporting member, a member mounted on said supporting member for sliding and limited swinging movements in a common plane, said members having opposed faces, spaced bearing elements between said opposed faces of said members spacing apart said faces and maintaining said faces out of mutual surface contact except at said bearing elements, means for moving said supporting member in a direction perpendicular to said plane of movement of said slidable and swingable member, a control mechanism, including a lever attached to said slidable and swingable member, connected to the means for moving said supporting member in said perpendicular direction, said control mechanism being rockable about a universal pivot to cause said lever to effect slidable and swinging movements of said slidable and swingable member in said common plane, and said control mechanism including a member movable in the direction of its length to effect movement of said supporting member in said perpendicular direction, and a linkage system connecting said slidable and swingable member to the element being manipulated.

12. A microscope manipulator according to claim 11, wherein said control mechanism includes a hand grip rockable about a universal end pivot mounted in a fixed seating and connected to said slidable and swingable member by a lever linkage adapted to transmit to said slidable and swingable member movement derived from a rocking operation of said hand grip about its universal pivot, said hand grip being connected to said lever linkage by a coupling adjustable along the length of the lever of the linkage, whereby the leverage ratio of the linkage may be varied.

13. A microscope manipulator according to claim 11, wherein said control mechanism includes a hand grip connected to a screw means constituting a part of said mechanism, and a mechanical coupling is disposed between said screw means and said supporting member to communicate movement of said screw means effected by rotation of said hand grip about the axis of said screw means, to said supporting member, whereby to move said supporting member in said perpendicular direction.

14. A microscope manipulator comprising relatively movable under base and upper base sections, a supporting member mounted on said upper base section for movement therewith, a member mounted on said supporting member for sliding and limited swinging movements in a common plane, said members having opposed faces, spaced bearing elements disposed between the opposed faces of said members to maintain said opposed faces spaced from each other and out of mutual surface contact except for contact at said spaced bearing elements, manually operable means connected to said under base and upper base sections for moving said upper base section with respect to said under base section for effecting coarse adjustment of said upper base section and of the supporting member and the sliding and swingable member mounted thereon, manually operable means connected to one point of said slidable and swingable member for transmitting movement thereto for effecting fine adjustment of said slidable and swingable member with respect to said supporting member independently of said coarse adjustment of said upper base section and said under base section, and a linkage system connected between another point of said slidable and swingable member and the element being manipulated.

15. A microscope manipulator according to claim 14 and including manually operable lock means between said upper base section and said under base section for securing said sections in any desired position of coarse adjustment.

16. In a microscope manipulator, a supporting member having a plane surface; a slidable member having a plane surface opposed to the plane surface of said supporting member; bearing elements between said opposed plane surfaces at spaced points therealong and comprising a V-shaped groove, a conical surface, a plane bearing surface, and opposed, cooperating spherical surfaces, one of which spherical surfaces engages each of said V-shaped groove, said conical surface, and said plane bearing surface, said bearing elements holding the opposed plane surfaces of said members out of mutual surface contact except at said spaced bearing elements; manually operable means for effecting sliding movement of said slidable member in relation to said supporting member; and means for connecting said slidable member to the microscopic element being manipulated.

References Cited in the file of this patent

UNITED STATES PATENTS

| Number | Name | Date |
|---|---|---|
| 1,828,460 | Emerson | Oct. 20, 1931 |
| 1,987,733 | De Fonbrune | Jan. 15, 1935 |
| 2,070,037 | Bauersfeld | Feb. 9, 1937 |